United States Patent [19]

Yusa et al.

[11] 3,922,321

[45] Nov. 25, 1975

[54] METHYL METHACRYLATE RESINS AND GRAFTED ACRYLATE-BUTADIENE-STYRENE POLYMERS

[75] Inventors: Haruhiko Yusa; Yukihiro Ochiai, both of Iwaki, Japan

[73] Assignee: Kureha Kagaku Kogyo K.K., Japan

[22] Filed: June 17, 1974

[21] Appl. No.: 480,312

[30] Foreign Application Priority Data

June 16, 1973 Japan.............................. 48-67961

[52] U.S. Cl.......... 260/876 R; 260/879; 260/880 R; 260/881; 260/885; 260/886
[51] Int. Cl. ... C08f 15/18; C08f 19/08; C08f 19/02; C08f 19/10; C08f 19/16; C08f 19/20; C08f 37/18
[58] Field of Search ........................ 260/876 R, 879

[56] References Cited
UNITED STATES PATENTS

| 2,419,202 | 4/1947 | D'Alelio .......................... 260/876 R |
| 3,261,887 | 7/1966 | Mann .............................. 260/876 R |
| 3,264,373 | 8/1966 | Whitworth et al. ................. 260/879 |
| 3,671,610 | 6/1972 | Amagi et al..................... 260/876 R |

*Primary Examiner*—John C. Bleutge
*Assistant Examiner*—Thurman Kennis Page
*Attorney, Agent, or Firm*—Wenderoth, Lind & Ponack

[57] ABSTRACT

By emulsion polymerizing a monomer mixture of an alkyl acrylate, styrene, and butadiene to produce an emulsion of a rubber polymer (A), adding to the latex containing 100 parts by weight of the rubber polymer (A) from 25 to 150 parts by weight of a monomer mixture (B) comprising an alkyl methacrylate, with or without a cross-linking monomer, and a vinyl monomer copolymerizable therewith, polymerizing the resulting mixture of the mixture (B) and the latex thereby to produce a graft copolymer (I), and mixing this graft copolymer (I) and a methacrylic resin (II), a methacrylic resin composition of high transparency, impact strength, and weather resistance is obtained.

8 Claims, No Drawings

METHYL METHACRYLATE RESINS AND GRAFTED ACRYLATE-BUTADIENE-STYRENE POLYMERS

BACKGROUND OF THE INVENTION

This invention relates to novel methacrylic resin compositions having high transparency, impact strength, and resistance to weather effects.

In general, methacrylic resins such as polymethyl methacrylate possess excellent transparency, luster, and resistant to weather effects, which are hardly found in other resins, but have the drawback of brittleness when subjected to impact, whereby molded articles of methacrylic resins are subject to cracking and fracturing during transportation. As one measure for overcoming this drawback, the admixing with a methacrylic resin of a graft copolymer prepared by graft polymerizing methyl methacrylate onto a diene rubber such as a polybutadiene or a butadiene - styrene copolymer has heretofore been proposed.

Resin compositions of this nature, however, are disadvantageous in that transparency and weathering property, which are important original characteristics of methacrylic resins, must be sacrificed. In another proposed method (as disclosed in Japanese Patent Publication No. 9740/1972), use is made of a graft copolymer in which a butadiene - alkyl acrylate copolymer is used for the rubber substance. In this method, however, a butadiene quantity within the rubber substance of from 30 to 60 percent by weight is necessary in order to improve the transparency, and, for this reason, the weathering property of the composition becomes inferior to that of methacrylic resins. Thus, there is no real improvement.

SUMMARY OF THE INVENTION

It is an object of this invention to overcome the above described difficulties in the prior art and to provide methacrylic resin compositions of improved impact strength without lowering their thermal deformation temperature, transparency, and weathering property, which are characteristics, of methacrylic resins.

As a result of our study with this aim in view, we have found that it is possible to achieve this object by causing a monomer mixture containing an alkyl acrylate and styrene as predominant constituents and a small quantity of butadiene added thereto to undergo substantially complete polymerization by the emulsion polymerization process thereby to form a latex of a rubber polymer (A), adding to a latex containing this rubber polymer a monomer (B) which is an alkyl methacrylate or a monomer mixture containing an alkyl methacrylate as a predominant constituent and another vinyl monomer copolymerizable therewith, and mixing the graft copolymer (I) thus obtained with a methacrylic resin (II).

The nature, specific features, and utility of this invention will be more clearly apparent from the following detailed description beginning with a consideration of general characteristics and concluding with specific examples of practice illustrating preferred embodiments of the invention and comparison examples.

DETAILED DESCRIPTION

First, as the trunk polymer of the graft polymer of this invention, it is necessary to use a polymer prepared by subjecting to an ordinary emulsion polymerization process a monomer mixture of from 50 to 90 percent of an alkyl acrylate, from 5 to 30 percent of styrene, and from 1 to 20 percent of butadiene, all percentages here being by weight. Since the alkyl acrylate polymer, which is the predominant constituent of this rubber substance, is superior to diene rubbers in weather resistance, it is suitable for use as a trunk polymer of a reinforcing agent of a methacrylic resin. However, the use of this single polymer will result in a resin composition of greatly lowered transparency. When a copolymer rubber of styrene and a small quantity of butadiene is used to make up for this deficiency, the transparency of the product is greatly improved.

Styrene is used in the trunk polymer in a quantity in the range of from 5 to 30 percent by weight. We have found that whenever the quantity of styrene is outside of this range, a product of satisfactory transparency cannot be obtained. Moreover, a styrene quantity exceeding 30 percent by weight gives rise to a composition of unsatisfactory impact strength.

A small quantity of butadiene is added into the trunk rubber, whereby the transparency and impact strength of the resin composition produced are further improved. Moreover, a small quantity of butadiene less than 20 percent by weight, particularly less than 10 percent by weight has almost no effect on the weather resistance of the composition produced.

For the alkyl acrylate, those having an alkyl group with from 2 to 12 carbon atoms each, as represented by ethyl acrylate, butyl acrylate, n-octyl acrylate, and 2-ethylhexyl acrylate, can be used.

The rubber substance can be prepared by polymerization by an ordinary emulsion polymerization process, but by a measure such as reducing the quantity of the emulsifier used in this process, a rubber substance having rubber particles of large particle size within the latex is obtained. Alternatively, the rubber substance can be prepared by subjecting a rubber latex obtained by an ordinary emulsion polymerization process to a further treatment with a mineral acid such as hydrochloric acid and sulfuric acid or an acidic substance such as formic acid, acetic acid, and tartaric acid thereby to agglomerate and enlarge the bulk of the rubber particles. When the latex having large or enlarged rubber particles prepared by either of these processes is used, there if a further positive effect in improving the impact strength of the composition produced.

For the monomer to be grafted to the rubber substance, alkyl methacrylates each having an alkyl group with from 1 to 4 carbon atoms, representable by methyl methacrylate, ethyl methacrylate, and butyl methacrylate, can be used either singly or as a mixture of a plurality thereof. Furthermore, it is also possible to use in addition a mixture of monomers of other vinyl monomers such as styrene, acrylonitrile, and alkyl acrylates which are copolymerizable with alkyl methacrylates. In this case, the quantity of the alkyl methacrylate in the monomer mixture is required to be at least 50 percent by weight in order to assure good compatibility or mutual solubility of the graft copolymer and the methacrylic resin.

It is necessary that the quantity of the graft monomer to be added to the rubber latex be from 25 to 150 parts by weight relative to 100 parts by weight of the rubber component within the latex. We have found that when the graft polymer quantity exceeds the upper limit of this range, the resulting composition has low impact strength, and when it is less than the lower limit of this range, lumps are easily formed in the salting out process of the latex, and, moreover, the compatibility or mutual solubility of the graft copolymer and methacrylic resin decreases, whereby the transparency and impact strength of the resulting composition become low.

In accordance with this invention, it is also possible to add a small quantity of a cross-linking monomer to the rubber constituent monomer and the graft constituent monomer and thus carry out the polymerization. By this provision, a resin composition of further improved transparency and surface characteristics can be produced.

Examples of monomers suitable for use as this cross-linking monomer are divinyl benzene; mono-, di-, and triethylene glycol dimethacrylates and diacrylates; and 1,3-butanediol diacrylate. A quantity of this cross-linking monomer added of 2 percent by weight or less relative to the constituent monomers is sufficient to produce fully satisfactory results.

The necessary mixture ratio by weight of the graft copolymer and the methacrylic resin is from 5 : 95 to 40 : 60. We have found that when this ratio is less than 5 : 95, the impact strength of the resulting composition is deficient, and when this ratio is greater than 40 : 60, the thermal deformation temperature of the resulting composition is lowered, and its rigidity is impaired.

The term "methacrylic resin" is herein used to designate a polymer containing a predominant quantity of methyl methacrylate. More specifically, for this methacrylic resin a homopolymer of polymethyl methacrylate and copolymers of at least 50 percent by weight of methyl methacrylate and a monomer copolymerizable therewith as, for example, an alkyl acrylate, styrene, acrylonitrile, and an alkyl methacrylate having alkyl group with 2 or more carbon atoms.

In order to indicate more fully the nature and utility of this invention, the following specific examples of practice constituting preferred embodiments of the invention and comparison examples are set forth, it being understood that these examples are presented as illustrative only and that they are not intended to limit the scope of the invention. Throughout these examples, all quantities in "parts" are by weight.

Examples and Comparison Examples

An autoclave with an agitator is charged with 200 parts of deionized water containing 1.5 parts of potassium oleate, 0.005 part of ethylenediaminetetraacetic acid disodium salt (EDTA·2Na·2H$_2$O), 0.003 part of ferrous sulfate (FeSO$_4$·7H$_2$O), and 0.075 part of formaldehyde sodium sulfoxylate. Then, under a vacuum, 100 parts of each of the monomer mixtures of the rubber contents indicated in Table 1, each containing 0.3 part of diisopropylbenzene hydroperoxide (DHP), is added to a charge as described above.

In an actual instance, each batch of process materials obtained by the above described procedure was heated to 45°C and polymerized for 16 hours. The conversion was 98 percent of higher in each case.

To each rubber latex thus obtained, 0.1 part of sodium dioctyl sulfosuccinate was added, and the resulting mixture was mixed by agitation for 5 minutes. Thereafter, a 0.2-percent aqueous solution of hydrochloric acid and a 2-percent aqueous solution of caustic soda were simultaneously added through respectively separate nozzles into the mixture thus mixed. Then, as the pH value of the latex was held within a range of from 7.0 to 9.0, the latex particles were agglomerated and enlarged. The quantity of hydrochloric acid solution used was 200 parts. A 2-percent aqueous solution of caustic soda was further added to adjust the latex pH value at 10.0.

Next, to each of the above described rubber latexes (containing approximately 100 parts of rubber solid component), a graft constituent monomer or a monomer mixture (containing 0.3 percent by weight of DHP) of the quantities shown in Table 1 and 10 parts of water containing 0.15 percent by weight with respect to the monomer or monomer mixture of formaldehyde sodium sulfoxylate were added, and the resulting process materials were caused to react for 8 hours under a vacuum at 60°C.

To each graft copolymer latex thus obtained, an aqueous solution of hydrochloric acid was added to coagulate the latex, which was further subjected to dehydration, washing, and drying, whereupon a polymer in powder form was obtained except in Comparison Example 12, in which case, the polymer did not assume a powder form but was in the form of rubber-like lumps.

30 parts of each of the graft copolymers thus obtained and 100 parts of the methacrylic resins of the composition indicated in Table 1 were kneaded for 3 minutes with rolls of a surface temperature of 170°C. The resulting sheet was pressed for 7 minutes in a press at 200°C, whereupon a molded plate of 3-mm. thickness was obtained in each case.

The transparency, impact strength, and weather resistance of these molded plates were measured, whereupon the results as shown in Table 2 were obtained.

Table 1

| | Run No. | Rubber Component | | | | Graft component | | | | Methacrylic resin composition (part) | | |
|---|---|---|---|---|---|---|---|---|---|---|---|---|
| | | BA | St | But | EDMA | MMA | St | EA | EDMA | MMA | St | EA |
| Examples | 1 | 80 | 15 | 5 | 0 | 50 | 0 | 0 | 0.25 | 100 | 0 | 0 |
| | 2 | 77 | 13 | 10 | 0 | 50 | 0 | 0 | 0.25 | 100 | 0 | 0 |
| | 3 | 74 | 11 | 15 | 0 | 50 | 0 | 0 | 0.25 | 100 | 0 | 0 |
| | 4 | 76 | 13 | 10 | 1.0 | 50 | 0 | 0 | 0.25 | 100 | 0 | 0 |
| | 5 | 77 | 13 | 10 | 0 | 50 | 0 | 0 | 0 | 100 | 0 | 0 |
| | 6 | 77 | 13 | 10 | 0 | 80 | 0 | 0 | 0.4 | 100 | 0 | 0 |
| | 7 | 78 | 7 | 15 | 0 | 37.5 | 0 | 12.5 | 0.25 | 75 | 0 | 25 |
| | 8 | 60 | 25 | 15 | 0 | 41 | 9 | 0 | 0.25 | 82 | 18 | 0 |
| Comparison Examples | 9 | 83 | 17 | 0 | 0 | 50 | 0 | 0 | 0.25 | 100 | 0 | 0 |
| | 10 | 63 | 7 | 30 | 0 | 50 | 0 | 0 | 0.25 | 100 | 0 | 0 |
| | 11 | 77 | 13 | 10 | 0 | 200 | 0 | 0 | 1.0 | 100 | 0 | 0 |
| | 12 | 77 | 13 | 10 | 0 | 20 | 0 | 0 | 0.1 | 100 | 0 | 0 |
| | 13 | 85 | 0 | 15 | 0 | 37.5 | 0 | 12.5 | 0.25 | 75 | 0 | 25 |

Table 1-continued

| Run No. | Rubber Component | | | | Graft component | | | | Methacrylic resin composition (part) | | |
|---|---|---|---|---|---|---|---|---|---|---|---|
| | BA | St | But | EDMA | MMA | St | EA | EDMA | MMA | St | EA |
| 14 | 50 | 35 | 15 | 0 | 41 | 9 | 0 | 0.25 | 82 | 18 | 0 |

BA: n-butyl acrylate
St: styrene
But: butadiene
MMA: methyl methacrylate
EDMA: ethylene glycol dimethacrylate
EA: ethyl acrylate

Table 2

| | Run No. | Transparency (Tt-Td) | Charpy Impact Strength | Weather Resistance |
|---|---|---|---|---|
| Examples | 1 | 85 % | 5.6 kg·cm/cm² | almost no change |
| | 2 | 87 | 6.2 | '' |
| | 3 | 88 | 6.6 | slight yellowing |
| | 4 | 88 | 6.8 | almost no change |
| | 5 | 84 | 4.8 | '' |
| | 6 | 89 | 5.2 | '' |
| | 7 | 88 | 7.0 | slight yellowing |
| | 8 | 87 | 4.2 | '' |
| Comparison Examples | 9 | 79 | 2.6 | almost no change |
| | 10 | 89 | 7.2 | considerable yellowing |
| | 11 | 89 | 1.8 | almost no change |
| | 12 | 74 | 2.8 | '' |
| | 13 | 40 | 7.2 | slight yellowing |
| | 14 | 32 | 2.1 | '' |
| MMA Homopolymer | | 92 | 1.5 | almost no change |

Transparency (Tt-Td): Percent transmission parallel light rays wherein Tt: Total transmitance, and Td: Diffuse transmitance, difined in accordance with ASTM-D 1003-61
Charpy impact strength: ASTM-D256, V-notched
Weather resistance: Color tone variation after 1,000 hours irradiation with Sunshine Weather Meter From these results, it is apparent that the composition of this invention has excellent transparency, impact strength, and weather resistance, which considered together are superior to those of the Comparison Examples.

The Comparison Example 9 did not have butadiene contained within the rubber constituent of its graft copolymer, and, for this reason, the transparency and impact strength of the resulting composition are deficient.

The composition of the Comparison Example 10 is inferior in weather resistance because the quantity of butadiene within the rubber constituent is greater than the upper limit of the range of this invention. The impact strength of the composition of Comparison Example 11 is low because the quantity of the graft monomer is greater than the upper limit of the range of this invention, while the transparency and impact strength of the composition of the Comparison Example 12 are poor because the quantity of the graft monomer is small.

The compositions of the Comparison Examples 13 and 14 have low transparencies, and the composition of the Comparison Example 14 particularly has a low impact strength because the quantities of styrene in their rubber constituents are outside of the range of this invention.

We claim:

1. A resin composition of high transparency, inpact strength, and weather resistance comprising a mixture of from 5 to 40 percent of a graft copolymer (I) and from 60 to 95 percent of a polymer (II), selected from the group consisting of a homopolymer of polymethyl methacrylate and copolymers of at least 50 percent by weight of methyl methacrylate and a copolymerizable monomer selected from the group consisting of styrene, acrylonitrile, alkyl acrylates and an alkyl methacrylate having an alkyl group with 2 or more carbon atoms, the graft copolymer (I) being obtained by adding from 25 to 150 parts of a monomer mixture (B) comprising from 50 to 100 percents of an alkyl methacrylate, from 0 to 50 percent of a vinyl monomer and a cross-linking monomer, present in amounts of 2 percent or less by weight of the constituent monomers, copolymerizable therewith, to a latex containing 100 parts of a rubber polymer (A) and subjecting to polymerization the resulting mixture of the mixture (B) and the latex, the rubber latex (A) being obtained by emulsion polymerization of a monomer mixture comprising from 50 to 90 percent of an alkyl acrylate, wherein the number of carbon atoms in the alkyl group is from 2 to 12, from 5 to 30 percent of styrene and from 1 to 20 percent of butadiene, all quantities expressed above in percentages and parts being by weight.

2. A resin composition as claimed in claim 1 in which the alkyl acrylate of the latex has an alkyl group containing from 2 to 6 carbon atoms.

3. A resin composition as claimed in claim 1 in which the alkyl methacrylate of the monomer mixture has an alkyl group containing from 1 to 4 carbon atoms.

4. A resin composition as claimed in claim 1 in which the monomer mixture (B) consists essentially of an alkyl methacrylate having an alkyl group containing from 1 to 4 carbon atoms.

5. A resin composition as claimed in claim 2 in which the latex containing the rubber polymer (A) is in the form where the rubber polymer particles contained therein have been agglomerated by adding an acid to the latex.

6. A resin composition as claimed in claim 1 in which the cross-linking monomer is a monomer selected from the group consisting of divinylbenzene, mono-, di-, and triethylene glycol dimethacrylates and diacrylates and 1,3-butanediol diacrylate.

7. A resin composition as claimed in claim 1 in which the polymer (II) is a polymer of methyl methacrylate in which the methyl methacrylate is present in amounts from 50 to 100 percent.

8. A resin composition as claimed in claim 1 in which the methacrylic resin (II) is a polymer which consists essentially of methyl methacrylate.

* * * * *